United States Patent
Kol et al.

(10) Patent No.: US 8,332,369 B2
(45) Date of Patent: Dec. 11, 2012

(54) POLICY DRIVEN DISTRIBUTED DATA RESILIENCY

(75) Inventors: Ayla Kol, Sammamish, WA (US);
Dmitri Gavrilov, Redmond, WA (US);
Bradford Clark, Duval, WA (US);
Brian T. Kress, Redmond, WA (US);
James C. Kleewein, Kirkland, WA (US);
Gregory I. Thiel, Black Diamond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 12/638,235

(22) Filed: Dec. 15, 2009

(65) Prior Publication Data
US 2011/0145208 A1    Jun. 16, 2011

(51) Int. Cl.
*G06F 17/30* (2006.01)
(52) U.S. Cl. ........................ 707/694; 707/695
(58) Field of Classification Search .................. 707/694, 707/695
See application file for complete search history.

(56) References Cited

U.S. PATENT DOCUMENTS

| | | |
|---|---|---|
| 7,155,633 B2 | 12/2006 | Tuma et al. |
| 2007/0130255 A1 | 6/2007 | Wolovitz et al. |
| 2008/0065583 A1 | 3/2008 | Coverston et al. |
| 2008/0229277 A1* | 9/2008 | Devarakonda et al. ....... 717/104 |

OTHER PUBLICATIONS

Harker, et al., "Application Optimized Storage™ Solutions from Hitachi Data Systems for Microsoft Exchange", Retrieved at <<http://www.hds.com/assets/pdf/wp_application_optimized_storage_233_00.pdf>>, Sep. 2006, pp. 11.

Masters, Ian, "Business critical email system protection using data replication", Retrieved at <<http://www.continuitycentral.com/feature0553.htm>>, Feb. 22, 2008, pp. 3.

"Mailbox Resiliency", Retrieved at <<http://www.microsoft.com/exchange/2010/en/us/mailbox-resiliency.aspx>>, Nov. 13, 2009, pp. 2.

"High Availability and Disaster Recovery for Exchange Servers Through a Mailbox Replication Approach", Retrieved at <<http://www.fdsystems.co.uk/files/HighAvail_and_DR_for_Exchange-WhitePaper.pdf>>, Jan. 2008, pp. 11.

* cited by examiner

Primary Examiner — Baoquoc N To
(74) Attorney, Agent, or Firm — Turk IP Law, LLC

(57) ABSTRACT

A data resiliency layer provides manageable data resiliency policy options for email related applications. Through one or more APIs such applications are enabled to query whether a data resiliency policy is satisfied for a given mailbox or database at a given point in time. Email related applications may consume this information to modify their behavior such as to wait, repeat, or fail the actions at hand to the point where data committal is guaranteed to a degree specified by the data resiliency policy.

18 Claims, 6 Drawing Sheets

POLICY DRIVEN DISTRIBUTED DATA RESILIENCY

BACKGROUND

Electronic mail (email) use has become an integral part of people's daily lives. Many forms of communication, personal or business, have been replaced by email exchanges. Emails not only contain textual exchanges, but many modern email systems enable integration of multi-modal communications with emails. Thus, increasing amounts of textual, audio, video, and other forms of communication data is stored in individual mailboxes and central data storage facilities as part of the vast email exchange networks.

In addition to local replication, email related data is also replicated commonly in different locations. With hard disk sizes reaching to Terabytes, traditional raid solutions are rendered impractical. Moreover, geographical, political, and technical disturbances requiring geo-replication of data, email data is frequently replicated asynchronously to multiple physical locations in order to ensure data resiliency under various failure conditions. With the asynchronous nature of such data resiliency solutions comes the challenge as to how an application that pushes new data into email repository can ensure the new content has been committed to sufficient copies to guarantee data resiliency within the existing deployment.

Organizations and service providers typically have data resiliency policies (e.g. how frequently, in how many locations, and which portions of the data is to be replicated). Data replication solutions (e.g. log shipping, hardware based replication solutions, etc.) commonly work independently from applications that put new content into mailbox (e.g. archival services, legal search tools, import/export-mailbox tools, etc.), and these two are unaware of each other.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a data resiliency layer to making available manageable data resiliency policy options for email related applications. Through one or more Application Programming Interfaces (APIs) such applications are enabled to query whether a data resiliency policy is satisfied for a given mailbox or database at a given point in time. Email related applications may consume this information to modify their behavior such as to wait, repeat, or fail the actions at hand to the point where data committal is guaranteed to a degree specified by the data resiliency policy.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
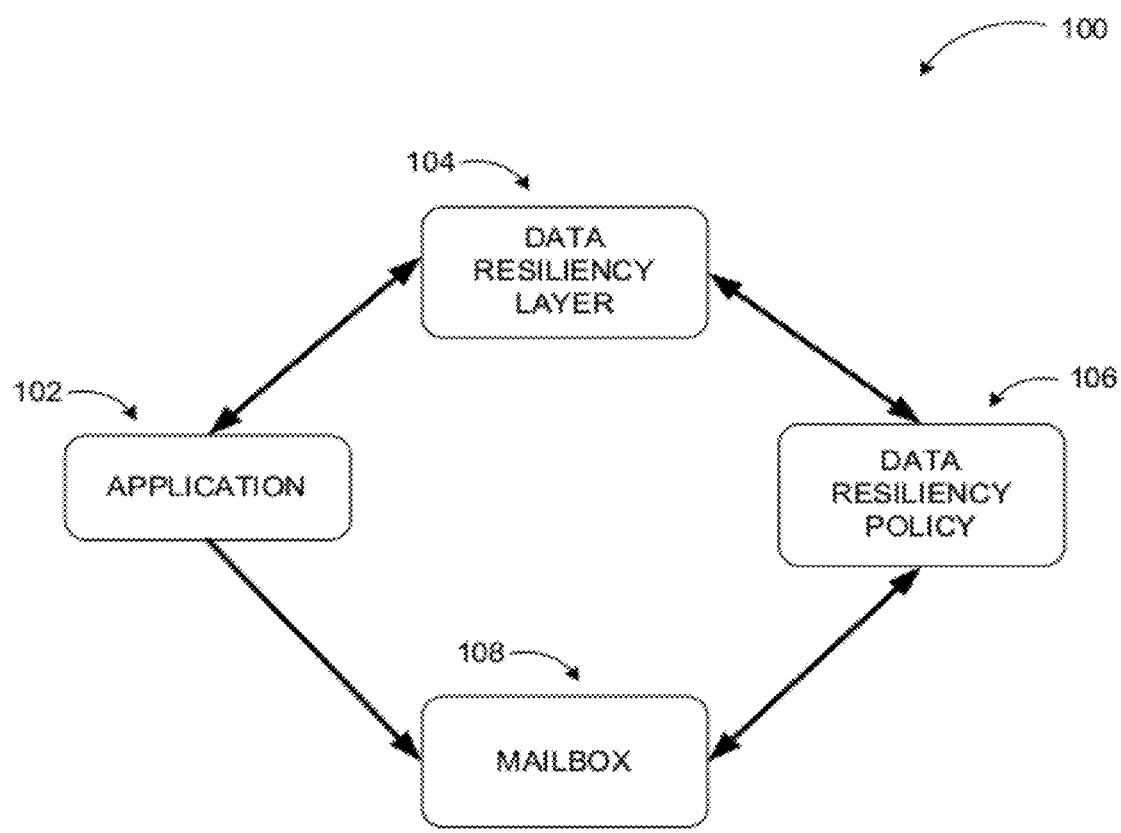
FIG. 1 is a conceptual diagram illustrating interactions between an email related application, mailbox, and data resiliency layer according to embodiments for implementing data resiliency policy.

As briefly described above, a data resiliency layer may be implemented through one or more APIs such that email related applications are enabled to query whether a data resiliency policy is satisfied for a given mailbox or database at a given point in time. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via computer-readable memory device including: one or more of a volatile computer memory, a non-volatile memory, a hard drive, a flash drive, a floppy disk, or a compact disk, and comparable media.

Throughout this specification, the term "platform" may be a combination of software and hardware components for managing email systems and data replication for email systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, conceptual diagram 100 illustrating interactions between an email related application, mailbox, and data resiliency layer according to embodiments for implementing data resiliency policy, is illustrated.

As discussed above, large amounts of data is replicated in modern email systems in various virtual and physical locations, sometimes in different countries or continents. Due to the size of data to be replicated and system resource considerations (bandwidth, memory, processing capacity, etc.), replication is typically performed asynchronously. In many systems, the data replication solution(s) and the application(s) providing the data to be replicated are independent from each other. It is not uncommon for the data to be provided to a mailbox from an application external to the email system, processed by a mail service/application, and replicated by yet another application working in conjunction with the mail service/application.

Thus, the application providing the data may not know whether a data resiliency policy is being satisfied and continue to provide the data wasting system resources. In a system according to embodiments, data resiliency layer 104 acts as an intermediary between the independent data resiliency solution (data resiliency policy 106) and the application 102 providing the data to be replicated. Email data resiliency policies may include options like no resiliency, one more copy, multiple copies, one copy at a different geographical location, one copy with lag, etc. These policies may be defined within the capabilities of the data resiliency layer 104 and natively managed by the administrators responsible for data resiliency.

Application 102 may check with data resiliency layer 104 prior to and/or following the delivery of the data to mailbox 108 and receive a confirmation that the data resiliency policy 106 has been satisfied or not. If the policy is satisfied, application 102 may continue its operations (e.g. continue providing more data). Otherwise, application 102 may provide a failure notice to the user, wait until the policy is satisfied, or perform other actions.

Data resiliency layer 104 may provide one or more APIs to enable application 102 to query data resiliency layer 104 regarding the data resiliency policy satisfaction. According to some embodiments, same set of APIs may also be used to throttle multiple applications in order to reduce the load on the data resiliency layer 104.

Figure 2:
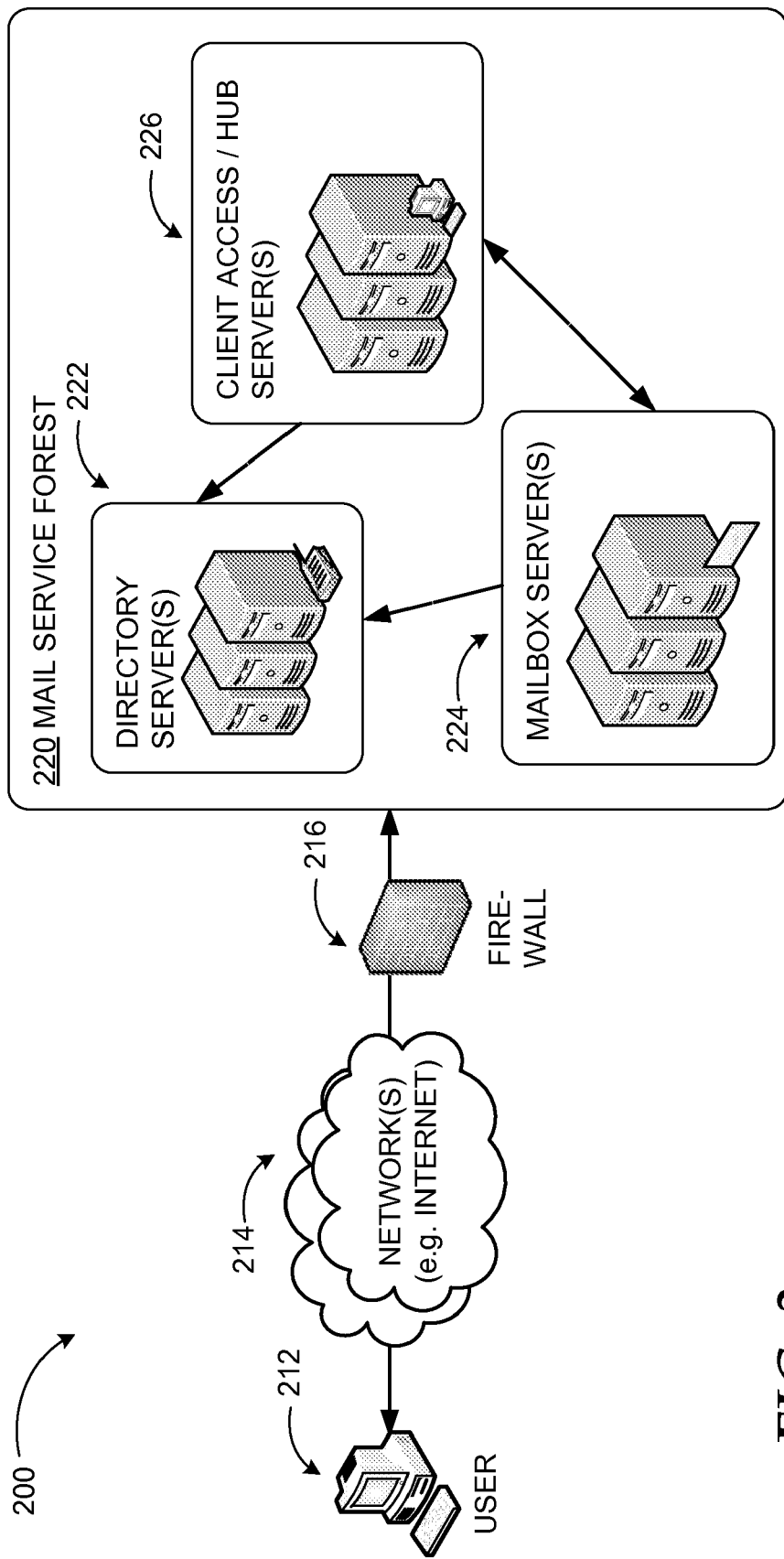
FIG. 2 is a conceptual diagram illustrating major physical components of an email system where a data resiliency layer according to embodiments may be used to notify an email related application about satisfaction of a data resiliency policy during operations.

FIG. 2 is a conceptual diagram illustrating major physical components of an email system where a data resiliency layer according to embodiments may be used to notify an email related application about satisfaction of a data resiliency policy during operations.

In an example system, such as the one shown in diagram 200, user 212 may communicate with a mail service over network(s) 214, which may include the Internet. To ensure security, firewall 216 may be employed between the network (s) 214 and mail service 220, which includes the servers executing various applications associated with the mail service.

Mail service forest 220 may include directory servers 222, which enable administrators to assign policies, deploy software, and apply critical updates to an organization. Directory servers 222 may store information and settings in a central database. Directory servers 222 may manage networks of computing devices varying from a small installation with a few computers, users and printers to tens of thousands of users, many different domains and large server farms spanning many geographical locations. A data resiliency policy managed by directory servers 222 may be implemented by an external or internal data replication solution such as log shipping, hardware based solutions, and comparable ones.

Mail service forest 220 may also include mailbox servers 224 managing the mailboxes, public folders, and data replication solutions. Mailbox servers 224 may employ local or remote data storage to store mailbox and other data. Another group of servers that may be included in mail service forest 220 is client access/hub servers 226. Client access/hub servers 226 may manage email related applications, protocols, and mail services for user 212, as well as route communications. Data replication solutions may be managed by mailbox servers 224.

In addition to managing various protocols for the mail service, client access/hub servers 222 may also execute or coordinate execution of external applications. Such applications may include archiving services, search tools, import/ export tools, and similar ones. On top of data provided to mailbox(es) by the email related applications, data to be replicated may include any data moved between mailboxes, mailboxes and public folders, and so on. Data resiliency policy defines which portion (or all) of the data is to be replicated, how frequently it is to be replicated, to where (destination) the data is to be replicated, and similar parameters. Data resiliency policy may also specify these parameters based on data type. For example, some data may be replicated at certain frequency to select locations, while other data may be replicated at different frequency and possibly to other locations. Mailbox servers 224 ensure the policy is complied with.

In a system according to embodiments, a data resiliency layer implemented in one of the mailbox servers may interact with the data replication solution determining the current status of data resiliency policy in response to a query from an application providing data. The data resiliency layer may then provide that information to the querying application.

The example system of FIG. 2 is for illustration purposes, and does not constitute a limitation on embodiments. A system implementing policy driven distributed data resiliency may be implemented in any system with fewer or additional physical and software components. Moreover, the applications and services discussed above may be executed by other servers, in other configurations, using the principles described herein.

Figure 3:
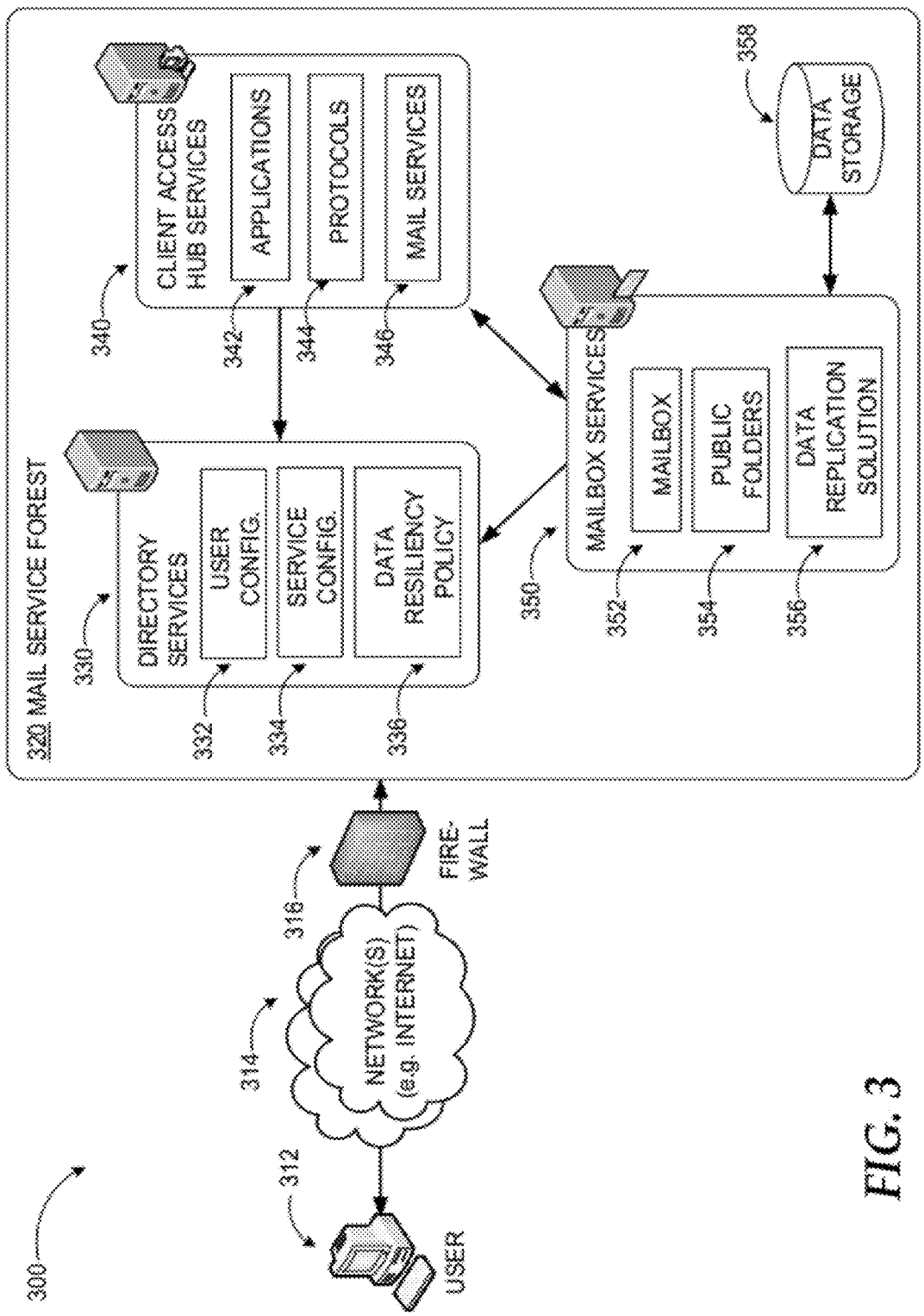
FIG. 3 is a conceptual diagram illustrating major software components of an email system where a data resiliency layer according to embodiments may be used to notify an email related application about satisfaction of a data resiliency policy during operations.

FIG. 3 is a conceptual diagram illustrating major software components of an email system where a data resiliency layer according to embodiments may be used to notify an email related application about satisfaction of a data resiliency policy during operations.

In diagram 300, user 312 communicating over network(s) 314 and through firewall 316 is routed by the client access/ hub services 340 of mail service forest 320. Mailbox services 350 manage mailboxes 352, public folders 354, and data replication solution 356. Mailbox services 350 may also manage local storage (358) of email data. Client access/hub services 340 manage protocols 344 and email related applications 342 in addition to mail services 346. Examples of applications 342 may include search applications, import/export applications, archive applications, and comparable ones. Applications 342 may generate or import data associated with user 312's mailbox(es), some or all of which may have to replicated according to data resiliency policy 336. Directory services 330 manage user configurations 332, service configurations 334, and data replication policy 336. An example of directory services 330 is Active Directory® service of Microsoft Corp. of Redmond, Wash.

Mailbox services 350 may also manage enforcement of data resiliency policy 336 by implementing a data replication solution 356 or coordinating with an external data replication solution. Applications 342 may be agnostic and not care about the data resiliency policy at all. Alternatively, applications 342 may care about the data resiliency policy at different levels. For example, one application may be interested in knowing whether or not the policy is satisfied, while another application may ask for more detailed information regarding the enforcement of the data resiliency policy.

In an example scenario, a data import application may provide imported data to mailbox service 350, and need to know whether the date was successfully written and replicated according to the data resiliency policy before deleting the data at the source. In this example scenario and similar ones, a data resiliency layer executed by the mailbox services 350 (or by another service) may act as an information clearing house providing applications 342 manageable options for data resiliency policy 336. Depending on the information needed by each application, administrator/user/otherwise manageable options may be set and the data replication solution queried for the status of the data resiliency policy implementation each time an application requests information. By providing the policy satisfaction information to the application, the data resiliency layer enables the application to take actions such as repeating a data write, waiting before another data write, issuing a failure notification, and similar ones.

Since some of the applications 342 may not be able to communicate directly with the data replication solution, standardized APIs may be employed by the data resiliency layer. This way, the applications to do not need to be configured to communicate with the data resiliency layer or the data replication solution. It simply needs to utilize one or more of the available APIs to query the data resiliency layer.

While the example system in FIG. 3 has been described with specific components such as routing services, public folders, etc., embodiments are not limited to systems according to this example configuration. An email system employing data resiliency through data resiliency layer may be implemented in other systems and configurations employing fewer or additional components. Furthermore, embodiments are not limited to email systems. Indeed, any networked system implementing data replication based on a data resiliency policy may implement a data resiliency layer for interacting with data providing applications using the principled discussed herein.

Figure 4:
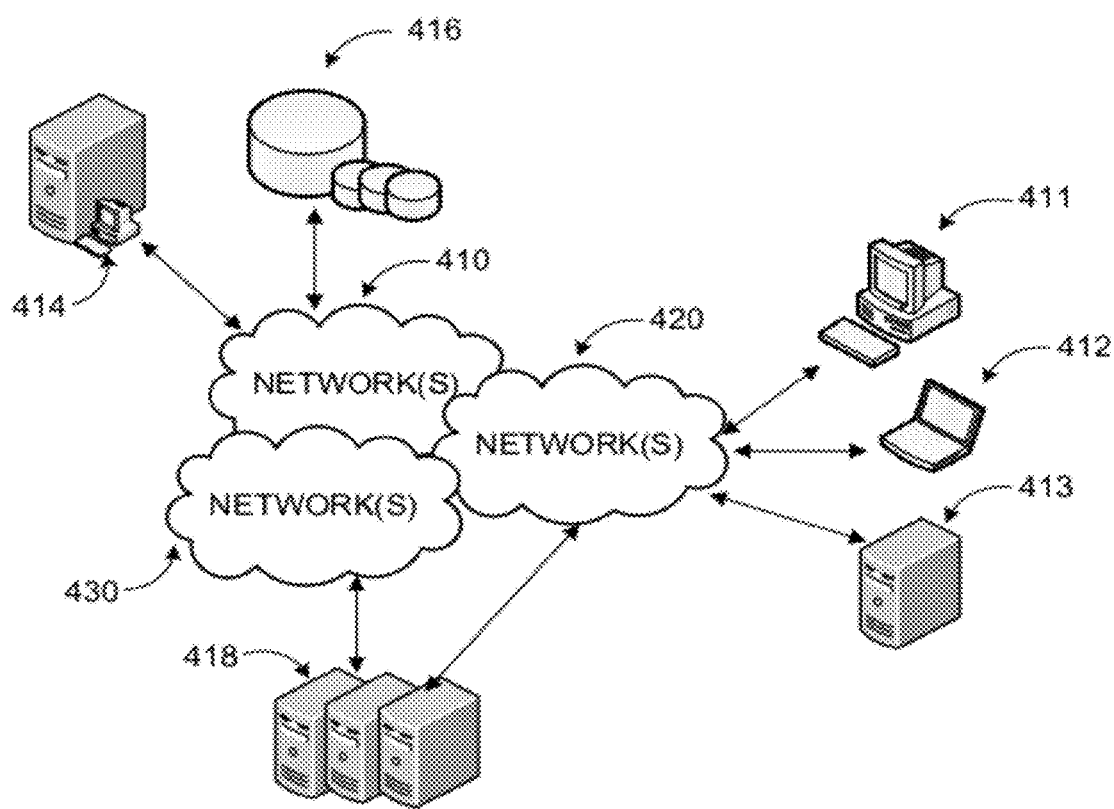
FIG. 4 is a networked environment, where a system according to embodiments may be implemented.

FIG. 4 is an example networked environment, where embodiments may be implemented. A platform providing data replication services within email systems may be implemented via software executed over one or more servers 418 such as a hosted service. The platform may communicate with client applications on individual computing devices such as a server 413, and a laptop computer 412 or desktop computer 411 ('client devices') through network(s) 410, 420, and 430.

As discussed above, modern email systems include many aspects and components such as mailbox/public folder services, data replication, and related applications data push data into the system. Servers 418 may execute these different aspects centrally or in a distributed fashion and interact through one or more of the network(s) 410, 420, and 430.

A service or an application executed on client devices 411, 412 or server 413 may attempt to push data into the mailbox of a user as part of an email related operation. A data resiliency layer as discussed above may act as intermediary between the service or application and a data replication solution associated with the mailbox (e.g. executed on server 414), determine whether a data resiliency policy for the mailbox is satisfied, and notify the service or application such that the service or application can adjust its operations accordingly. Replicated data may be stored in one or more locations such as data stores 416.

Network(s) 410, 420, and 430 may comprise any topology of servers, clients, Internet service providers, and communication media. A system according to embodiments may have a static or dynamic topology. Network(s) 410, 420, and 430 may include secure networks such as an enterprise network, an unsecure network such as a wireless open network, or the Internet. Network(s) 410, 420, and 430 may also coordinate communication over other networks such as Public Switched Telephone Network (PSTN) or cellular networks. Furthermore, network(s) 410, 420, and 430 may include short range wireless networks such as Bluetooth or similar ones. Network (s) 410, 420, and 430 provide communication between the nodes described herein. By way of example, and not limitation, network(s) 410, 420, and 430 may include wireless media such as acoustic, RF, infrared and other wireless media.

Many other configurations of computing devices, applications, data sources, and data distribution systems may be employed to implement an email system with policy driven distributed data resiliency. Furthermore, the networked environments discussed in FIG. 4 are for illustration purposes only. Embodiments are not limited to the example applications, modules, or processes.

Figure 5:
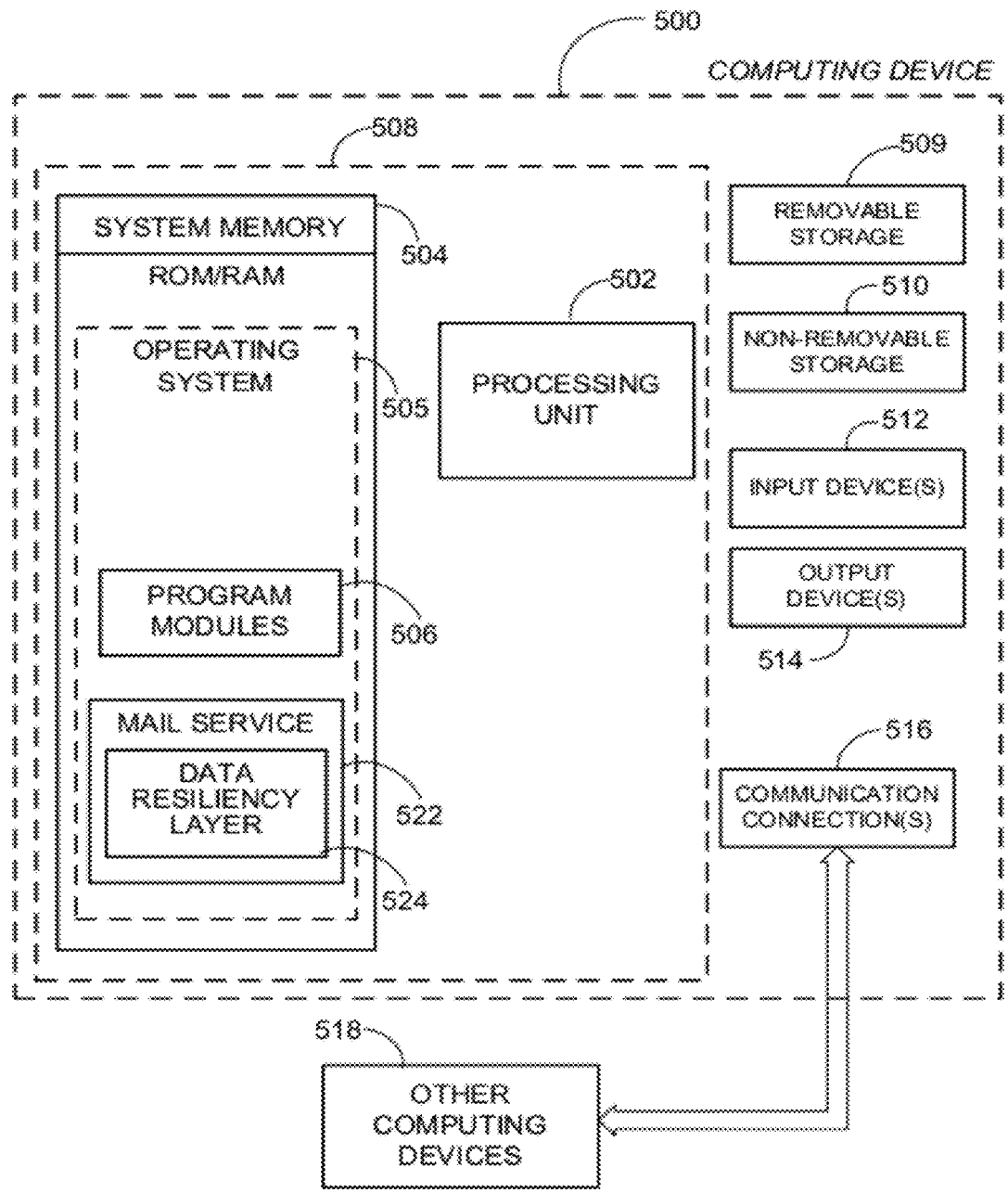
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a mailbox server managing mailbox operations as part of an email system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, mail service 522, and data resiliency layer 524.

Mail service 522 may perform various email related operations including receiving data from related applications such as those discussed before. In order to provide such applications information about whether or not data resiliency policies associated with the mailbox and/or specific forms of data are satisfied, data resiliency layer 524 may be implemented in conjunction with mail service 522 (e.g. as one or more APIs) as discussed above. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
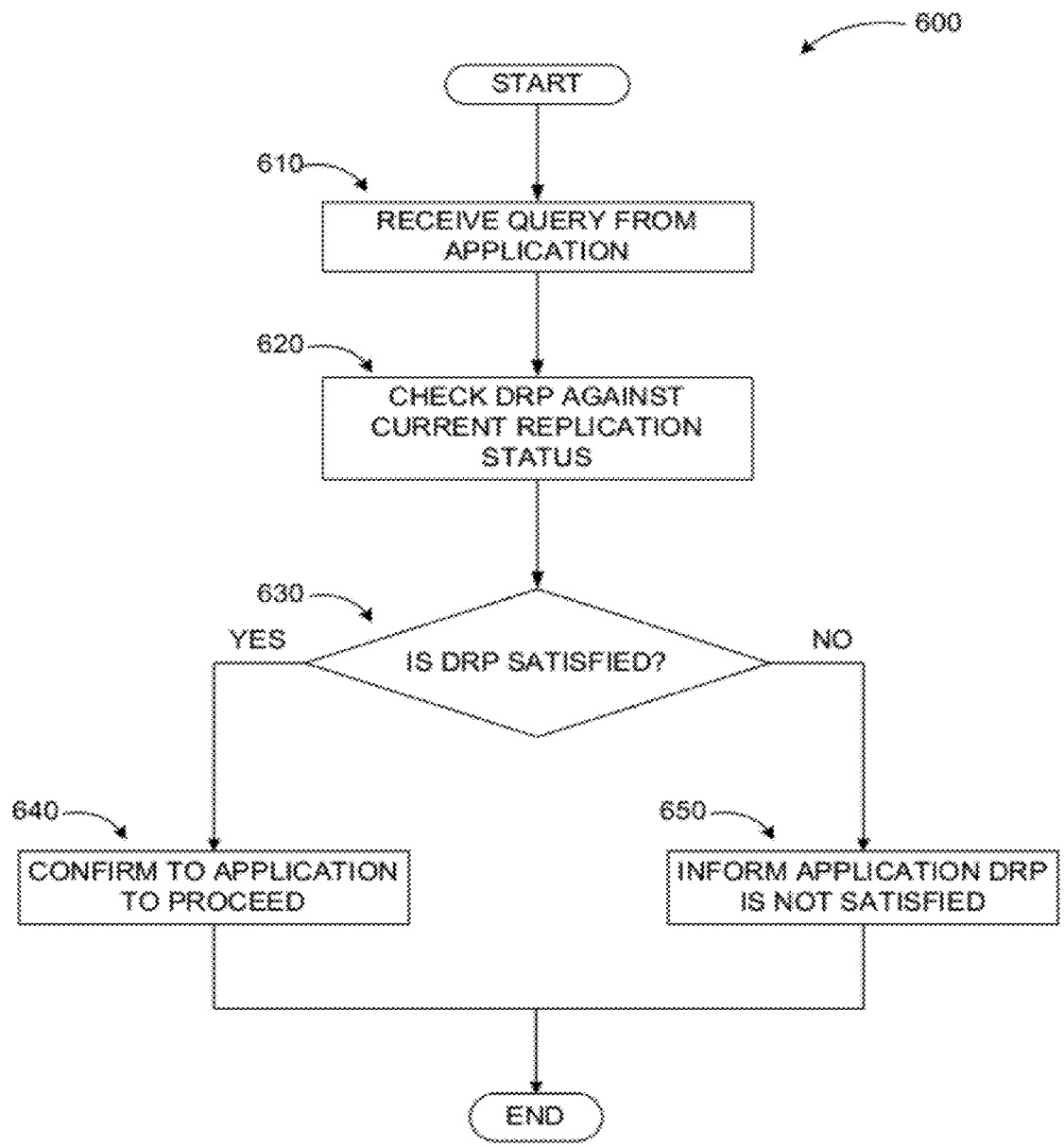
FIG. 6 illustrates a logic flow diagram for notifying an application about compliance with a data resiliency policy according to embodiments.

FIG. 6 illustrates a logic flow diagram for process 600 of notifying an application about compliance with a data resiliency policy according to embodiments. Process 600 may be implemented as part of an email system that facilitates data replication.

Process 600 begins with operation 610, where a query is received from an application pushing data to the mailbox. The flow of operations shown in process 600 may be executed multiple times by the application, for example, during a pre-check, during data push, at the completion of a data push, and similar stages. The data resiliency layer, in response, checks the data resiliency policy against the current replication status at operation 620. This may be done by communicating with a data replication solution, which may or may not be an integral part of the email system.

At decision operation 630, a determination is made whether the data resiliency policy is satisfied. If the policy is not yet satisfied, the application may be notified as shown in operation 650 and/or further checks against the current policy performed. When the data resiliency policy is not satisfied, the application can choose to wait, to retry, or fail the current replication job. This, the application may transition into a wait mode, repeat the data write, or cancel its operations and provide a failure report depending on the response. According to some embodiments the application may be enabled to define one or more parameters associated with the implementation and querying of the DRP.

If the policy is determined to be satisfied at decision operation 630, a confirmation may be sent to the querying application at operation 640 such that the application can proceed to its next steps (e.g. checking the requirements when accepting jobs, checking the status before every batch of data being moved into a mailbox, etc.).

The operations included in process 600 are for illustration purposes. An email service with policy driven distributed data resiliency capability may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for implementing policy driven distributed data resiliency, the method comprising:
   receiving a first portion of data from an application for a mailbox;
   receiving a query at a Data Resiliency Layer (DRL) from the application providing data to the mailbox;
   querying a Data Replication Solution (DRS) as to whether a Data Resiliency Policy (DRP) is satisfied regarding the first portion of the data provided by the application;
   if a confirmation response is received from the DRS:
     providing an affirmative reply to the query from the application based on the response from the DRS; and
     continuing to receive additional portions of the data from the application for the mailbox;
   else:
     receiving a failure response from the DRS, wherein the reply includes one of a confirmation indication and a failure indication depending on the received response;

performing one of: repeating a data write; transitioning into a wait mode until a confirmation reply is received; and cancelling the data write and reporting failure.

2. The method of claim 1, further comprising:

querying the DRS, receiving a response, and providing the reply to the querying application during at least one from a set of: a pre-check, a data push, and following a completion of a data push.

3. The method of claim 1, further comprising:

employing at least one Application Programming Interface (API) to communicate with the application.

4. The method of claim 3, wherein the at least one API is further utilized to throttle a plurality of applications providing data to the mailbox such that a load on the DRL is reduced.

5. The method of claim 1, wherein the response from the DRS includes detail information associated with the DRP, and the method further comprises:

providing the detail information associated with the DRP to the querying application.

6. The method of claim 1, wherein the DRL is configured to provide manageable options associated with the DRP to the application.

7. The method of claim 1, wherein the options associated with the DRP are defined by at least one of: an administrator and the application providing the data.

8. The method of claim 1, wherein the DRL is part of an email system and the application includes one of: a search application, an archiving application, a database application, a data import application, and a data export application.

9. The method of claim 1, wherein the DRP defines at least one from a set of: a frequency of data replication, a location of data replication, a type of data to be replicated, a number of copies to be replicated, and a type of copies to be replicated.

10. A system for facilitating data replication in electronic mail services implementing policy driven distributed data resiliency, the system comprising:

a first server performing actions including:

manage Data Resiliency Policy (DRP) associated with at least one mailbox managed by the system;

coordinate enforcement of the DRP through a Data Replication Solution (DRS);

a second server performing actions including:

manage interactions of an application providing data to the at least one mailbox with the system; and a third server performing actions including:

manage a Data Resiliency Layer (DRL), the DRL configured to:

employ at least one Application Programming Interface (API) to communicate with the application, wherein the at least one API is further utilized to throttle a plurality of applications providing data to the at least one mailbox such that a load on the DRL is reduced;

receive a query from the application through the at least one API following a completion of a data write;

request a DRP status from the DRS;

if the DRP status is confirmed:

notify the application such that the application is enabled to continue providing data to the at least one mailbox subsequent to confirming the DRP status;

else:

perform one of: repeating the data write; transitioning into a wait mode until a confirmation reply is received; and cancelling the data write and reporting failure.

11. The system of claim 10, wherein DRL is further configured to confirm the DRP status in response to one of: the application attempting to write search data to the at least one mailbox, the application attempting to write archive data to the at least one mailbox, the application attempting to write imported data to the at least one mailbox, and data being attempted to be moved between mailboxes.

12. The system of claim 10, wherein the DRS is at least one from a set of: an externally implemented software solution, an externally implemented hardware solution, and a program executed at the first server.

13. The system of claim 10, wherein the second server is configured to execute a plurality of applications providing data to the at least one mailbox and further configured to coordinate interactions of externally executed applications providing data to the at least one mailbox.

14. The system of claim 10, wherein the DRL employs a plurality of standardized Application Programming Interfaces (APIs) that are utilized to throttle data writes from a plurality of applications in order to reduce a load on the DRL.

15. A computer-readable memory device with instructions stored thereon for implementing policy driven distributed data resiliency, the instructions comprising:

receiving a query through at least one Application Programming Interface (API) at a Data Resiliency Layer (DRL) from an application providing data to a mailbox following a completion of a data write, wherein the at least one API is further utilized to throttle a plurality of applications providing data to the mailbox such that a load on the DRL is reduced;

querying a Data Replication Solution (DRS) as to whether a Data Resiliency Policy (DRP) is satisfied regarding the data provided by the application, wherein the DRS manages asynchronous replication of data associated with the mailbox as defined by the DRP;

if a confirmation response is received from the DRS:

providing a reply to the query from the application based on the affirmative response from the DRS such that the application is enabled to complete a data write;

else:

receiving a failure response from the DRS, wherein the reply includes one of a confirmation indication and a failure indication depending on the received response; and performing one of: repeating the data write; transitioning into a wait mode until a confirmation reply is received; and cancelling the data write and reporting failure.

16. The computer-readable memory device of claim 15, wherein the data is provided to the mailbox in steps, and the DRL is configured to query the DRP prior to a first step, after each step, and following the last step of data writes.

17. The computer-readable memory device of claim 15, wherein the instructions further comprise:

enabling the application to define at least one parameter associated with the implementation and querying of the DRP.

18. The computer-readable memory device of claim 15, wherein the replicated data is provided to at least one of the mailbox and an associated public folder over the Internet.

* * * * *